June 6, 1961 B. E. CURRAN 2,987,330
SEALED PIPE TO PIPE TO WALL JOINT
Filed Oct. 16, 1956 5 Sheets-Sheet 1

INVENTOR.
Bernard E. Curran
BY Robert R. Churchill

ATTORNEY

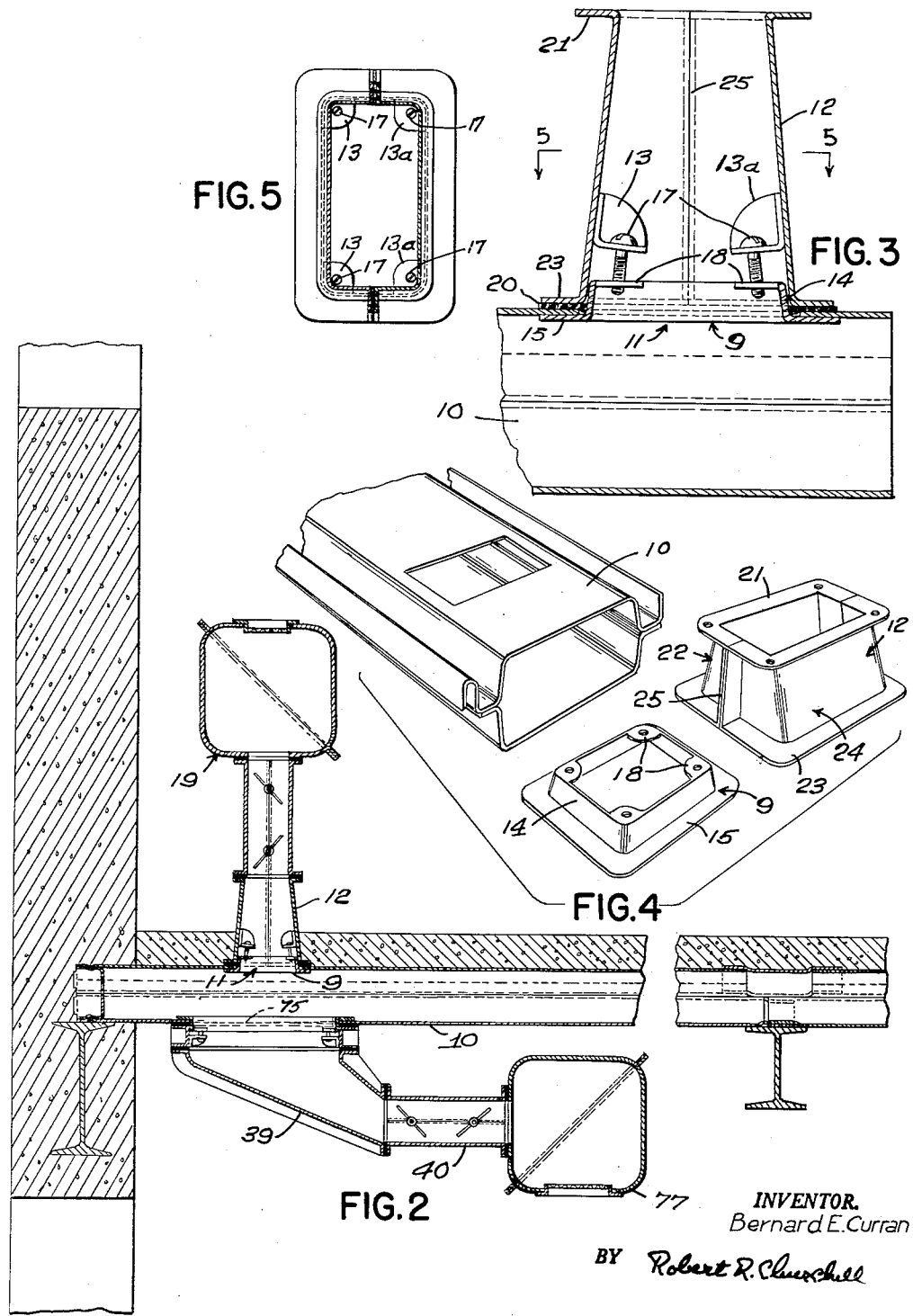

June 6, 1961   B. E. CURRAN   2,987,330
SEALED PIPE TO PIPE TO WALL JOINT
Filed Oct. 16, 1956   5 Sheets-Sheet 3
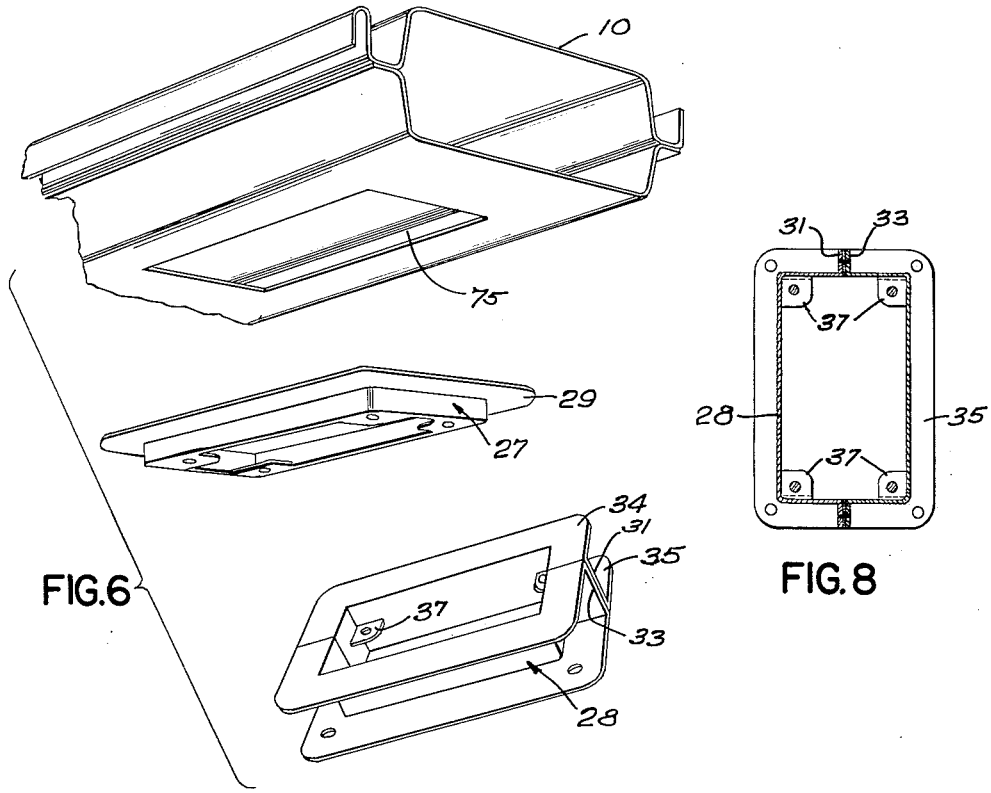
FIG.6
FIG.8
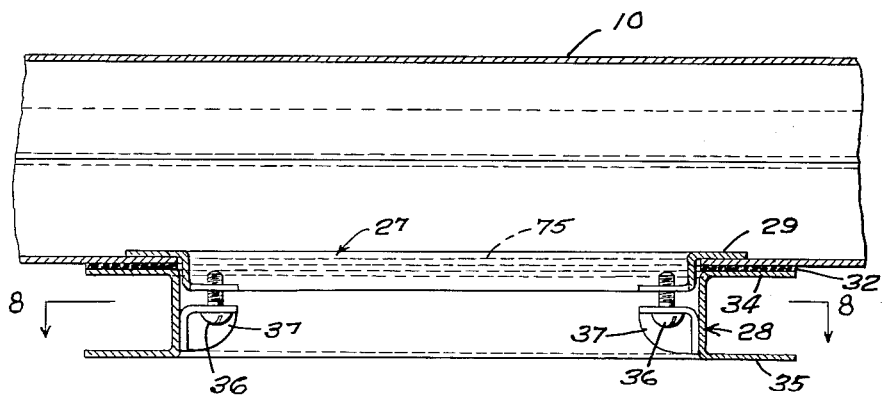
FIG.7
INVENTOR.
Bernard E. Curran
BY Robert R. Churchill
ATTORNEY June 6, 1961  B. E. CURRAN  2,987,330
SEALED PIPE TO PIPE TO WALL JOINT
Filed Oct. 16, 1956  5 Sheets-Sheet 4

INVENTOR.
Bernard E. Curran
BY Robert R. Churchill
ATTORNEY

INVENTOR.
Bernard E. Curran
BY Robert R. Churchill
ATTORNEY

United States Patent Office 2,987,330
Patented June 6, 1961

2,987,330
SEALED PIPE TO PIPE TO WALL JOINT
Bernard E. Curran, Sewickley, Pa., assignor to H. H. Robertson Company, Pittsburgh, Pa., a corporation of Pennsylvania
Filed Oct. 16, 1956, Ser. No. 616,285
1 Claim. (Cl. 285—159)

This invention relates to a building and air distributing structure and more particularly to a building and air conditioning structure of the type forming the subject matter of United States Patent to R. P. Goemann, No. 2,729,429, dated January 3, 1956.

The Goemann patent discloses a building and air conditioning and distributing system and apparatus wherein cellular metal floors form the load supporting structure at each of selected stories of a multi-story building, and the present invention has for an object to provide novel apparatus for conducting air from one or more of the air conducting floor cells to an outlet or discharge unit.

A further object of the invention is to provide novel connecting apparatus which may be used with advantage in connecting an outlet or discharge unit to an air conducting cell of the multicellular metal floor above referred to and which is of a construction adapted for plant manufacture and field assembly of the components of the connecting apparatus with the expenditure of minimum labor and difficulty.

With these general objects in view and such others as may hereinafter appear the invention consists in the connecting apparatus for the purpose described and in the various structures, arrangements and combinations hereinafter described and particularly defined in the claim at the end of this specification.

In the drawings illustrating the preferred embodiment of the invention:

FIG. 1 is a diagrammatic plan of a portion of a cellular metal floor wherein air is conducted through selected floor cells as shown in said Goemann patent above referred to;

FIG. 2 is a cross sectional view on line 2—2 of FIG. 1 viewed in the direction of the arrows;

FIG. 3 is a vertical sectional detail showing the preferred form of connecting apparatus erected upon the upper surface of an air conducting cell of a multicellular floor;

FIG. 4 is a perspective view illustrating the components of the connecting apparatus shown in FIGS. 2 and 3;

FIG. 5 is a cross sectional view taken on the line 5—5 of FIG. 3;

FIG. 6 is an exploded perspective view of the components of the connecting apparatus preferably used in connecting a ceiling outlet box to the underside of an air conducting cell of the floor;

FIG. 7 is a vertical sectional view illustrating the components of the connecting apparatus shown in FIG. 6 after erection;

FIG. 8 is a cross sectional view taken on the line 8—8 of FIG. 7;

Figure 1:
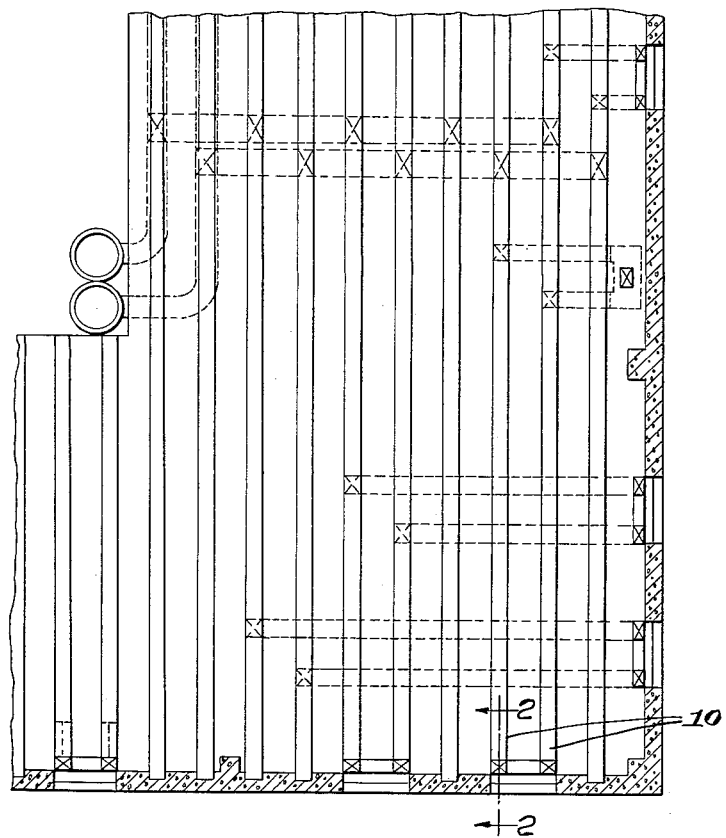

The building and air conditioning and distributing structure forming the subject matter of the Goemann patent above referred to embodies a cellular metal floor of the type illustrated in the patent to Young, No. 1,867,433, and wherein a multiplicity of air conducting cells form a part of the structural load supporting cellular metal floor itself. As illustrated in the Goemann patent, provision is made for supplying air, particularly conditioned air, to selected and a number of spaced air conducting floor cells, and the present invention is particularly concerned with novel connecting means or apparatus which may be used with advantage in making the connection between one or more of the air conducting cells to outlets disposed above or below a cellular metallic floor. In the various forms of the connecting means, herein illustrated, provision is made for simplifying the labor involved in field erection of the components and for facilitating the manufacture of the various components in the plant.

Referring now to the drawings, as shown in FIGS. 2, 3 and 4, the connecting apparatus is illustrated as mounted upon an air conducting cell of a multicellular metal floor and air distributing structure in a building of the type illustrated in the Goemann patent above referred to. The air conditioning cell 10 is provided with an opening 11 in the upper wall thereof, and the connecting apparatus is mounted upon the cell and in registry with the opening in the manner illustrated in FIGS. 2 and 3. The connecting apparatus comprises a hollow shoe 9 having a peripheral flange 15 projecting outwardly from the bottom of the shoe and with an upstanding portion 14 provided with inwardly projecting shelf portions 18. The upstanding portion 14 of the shoe is of a shape and size to permit it to extend through the opening 11 in the upper wall of the cell 10 and a stack member 12 is mounted upon the top of the cell, as shown in FIG. 3, being of a size and shape to snugly fit over the projecting upstanding portion 14 of the shoe. The stack member comprises a hollow duct, preferably made in identical half sections 22, 24, and the latter may be sealed together along engaging flanges 25 with a cementitious compound to render the seams airtight and then spot welded along the seamed flanges to secure the halves together. The stack member is provided with upper and lower projecting flange portions 21, 23, the lower flange portion 23 engaging a gasket 20 to provide an airtight joint between the flange and the top of the air conducting cell 10. The interior of the stack member is provided with four fastening lugs 13, 13a welded thereto and through which screws 17 are extended for cooperation with tapped openings in the inwardly projecting portions 18 at each corner of the top of the shoe as shown in FIG. 4. From the foregoing description it will be observed that the constructions of shoe and stack member are such as to enable these members to be readily fabricated in an economical manner in the plant. The upper flange portion of the stack is adapted for connection with any usual or preferred form of outlet box, one type of which is illustrated at 19 in FIG. 2.

In another embodiment of the invention, as illustrated in FIGS. 2, 6, 7 and 8, the connecting apparatus is designed particularly for establishing connection between one of the air conducting cells 10 of the multicellular floor above referred to through an opening 75 formed in the bottom wall thereof in order to provide a connection between the cells for the discharge of air through a ceiling outlet 77. As shown in FIGS. 6, 7 and 8, the connecting means comprises an upper shoe member 27 and a lower shoe member 28. The upper shoe member 27 may be identical in structure with the shoe member 9 above described and illustrated in FIG. 4, and the upper shoe member is inserted through the opening 75 in the lower wall of the air conducting cell 10 shown in FIG. 6 to dispose the flange 29 on the interior surface of the lower wall of the cell 10 surrounding the opening. The upstanding portion of the shoe extends downwardly through the opening into a position such as is illustrated in FIG. 7, and the lower shoe member 28 is connected thereto. The lower shoe member is preferably made, as illustrated in FIGS. 6 and 8, of two identical half sections in which the engaging flanges 31, 33 thereof may be coated with a cementitious compound and spot welded together providing an airtight connection between the flanges. The shoe is provided with top and bottom peripheral flanges 34, 35, as shown, and the upper flange is arranged to bear against a gasket 32 interposed between the outer surfaces of the bottom wall of the air conducting cell immediately surrounding the opening therein, and provision is made for clamping the upper and lower shoes together by fastening screws 36 extended through interior corner lugs 37 and screwed in the tapped holes in the lower flanges of the upper shoe 27 in the manner illustrated in FIG. 7. Any suitable type of ceiling outlet 77 may be connected to the lower flanges of the lower shoe, and as illustrated in FIG. 2, the connection may be made through an elbow duct 39 and a connecting chimney 40 secured to the ceiling outlet 77. From the description thus far it will be observed that this connecting structure lends itself to rapid and economical erection in the field and that the components thereof may be economically and rapidly manufactured in the plant.

Figure 9:
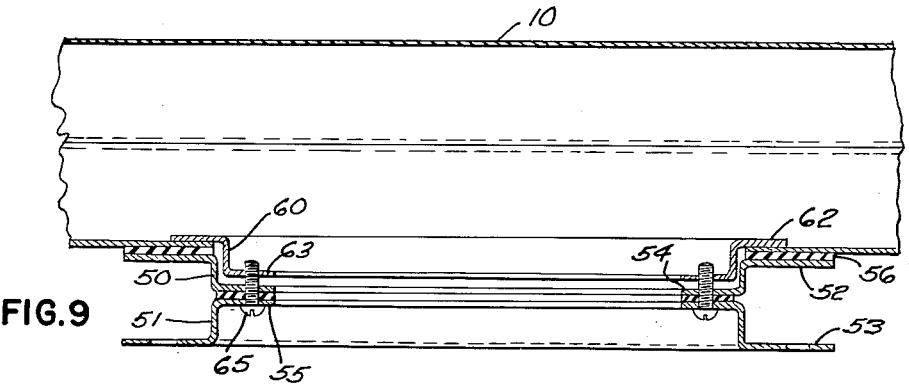
FIG. 9 is a vertical sectional view showing a modified form of the present connecting apparatus in its erected position.
Figure 10:
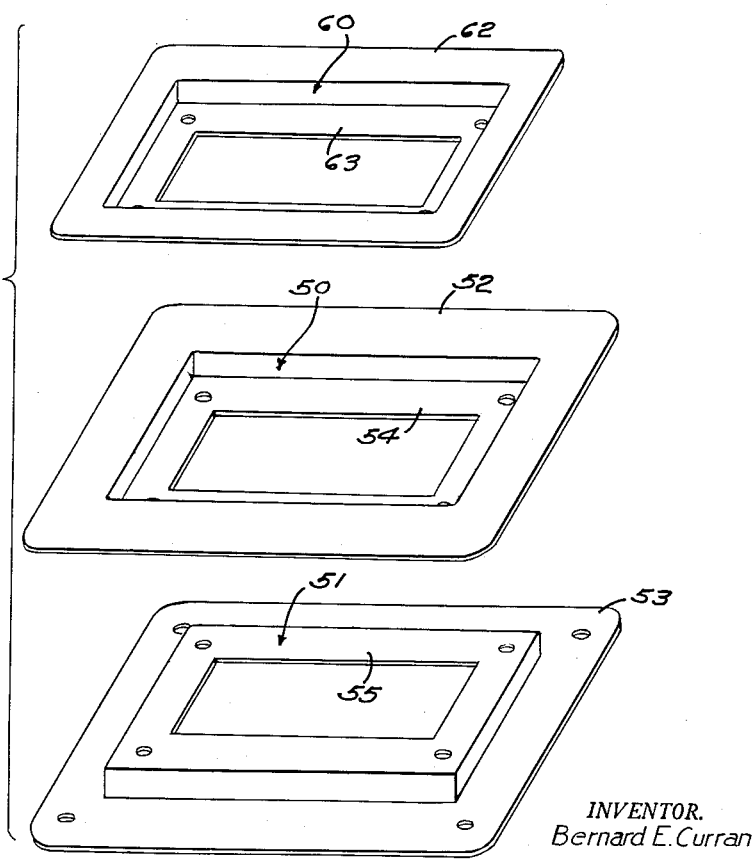
FIG. 10 is an exploded perspective view illustrating the relationship of the three component shoes of the structure shown in FIG. 9.

Referring now to FIGS. 9 and 10, a modified form of connecting means is illustrated to provide a connection between an air conducting cell 10 and a ceiling outlet, such as is illustrated in FIG. 2. The connection comprises a pair of identical flanged shoe members 50, 51 having outwardly projecting flanges 52, 53 and inwardly projecting flanges 54, 55. These identical flange members may be assembled in the manner illustrated in FIG. 9 with the inwardly projecting flanges 54 and 55 provided with an intervening gasket to connect the members in airtight engagement and with the outwardly projecting flanges 52 and 53 spaced apart. The outwardly projecting flange 52 of the upper shoe 50 is arranged to bear against a gasket 56 interposed between it and the outer surface of the lower wall of the air conducting cell surrounding the opening therein. The connection also includes a third shoe 60 having an outwardly projecting peripheral flange 62 and an inwardly projecting flange 63, and the shoe is made of a size to fit within the upper shoe 50 when all of the shoes are erected in the manner illustrated in FIG. 9 and to dispose the peripheral flange 62 of the third shoe against the inner surface of the wall of the air conducting cell surrounding the opening. The parts are connected together by screws 65 extending through the two inwardly projecting flanges 53, 55 of the first two shoe members and threaded into tapped holes in the inwardly projecting flange 63 of the third shoe member 60. It will be observed that the construction of the connection is simple and that the design of the parts of the components enables economical factory production to be made of the shoes so that in the field erection of the parts is simple and may be accomplished with minimum labor. In a manner analogous to that shown in FIG. 2 any suitable ceiling outlet may be connected to the lower outwardly projecting flange 53 of the bottom shoe member.

Figure 11:
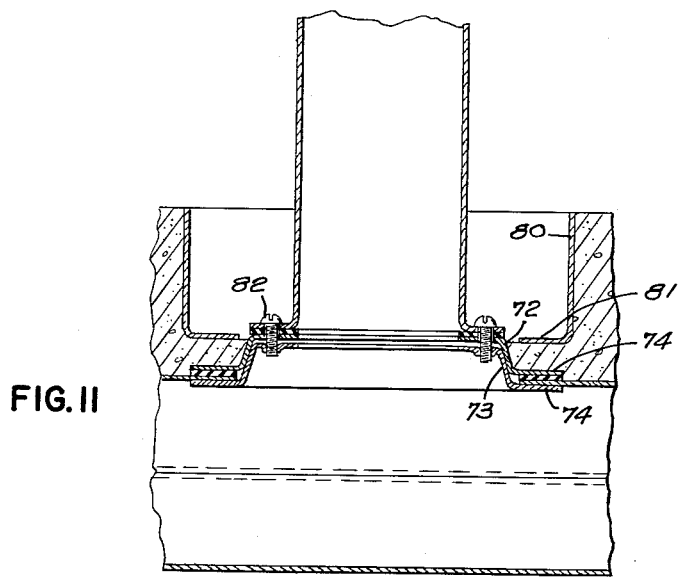
FIG. 11 is a vertical sectional view of a still further form of the present connecting means showing the parts in their erected position.
Figure 12:
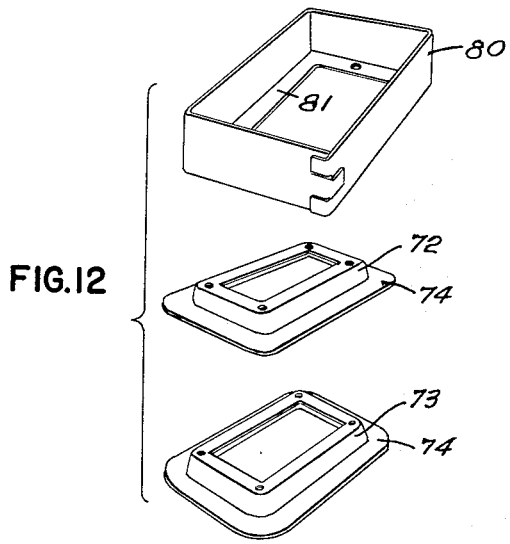
FIG. 12 is an exploded perspective view illustrating the relationship of the shoe members of the connecting means shown in FIG. 11 to a screed box.

Referring now to FIGS. 11 and 12, a still further modified form of connection is illustrated therein comprising a pair of similar shoe members 72, 73, each having a peripheral outwardly projecting flange 74 on their lower ends and each shaped to enable it to nest with the other shoe, and when erected to dispose the peripheral flange of the lower shoe 73 within the air conducting cell and against the portion of the wall thereof surrounding the opening therein and to dispose the peripheral flange of the upper shoe member in airtight relation to the corresponding outer surface of the wall of the cell and each of the inwardly projecting flange portions being provided with openings for the reception of fastening members 82, preferably screws. In practice this type of connecting means may be utilized with advantage in providing a connection between the cells and the outlet box, of the general type shown in FIG. 2, and a screed box 80 having an inwardly turned flange 81 may be located in operative position with relation to the floor cell when the cementitious floor first is being poured.

While the preferred embodiments of the invention have been illustrated and described, it will be understood that the invention may be embodied in other forms within the scope of the following claim.

Having thus described the invention, what is claimed is:

Connecting apparatus for use in connecting an outlet having a laterally extended flange to an air conducting cell of a multicellular metal floor and air distributing structure of a building, said cell having an opening in the upper wall thereof, said outlet connecting apparatus comprising a relatively short sheet metal upper upright hollow rectangular shoe member and a relatively short sheet metal upright hollow rectangular shoe member, each having side walls and integral outwardly extended bottom flanges arranged to embrace the inner and outer surfaces of the upper wall portions defining said opening, said shoe members being substantially the same shape with the upper of said shoe members being relatively larger and arranged in substantially nestling relation with the lower shoe member, each of said upright shoe members being also provided with integral inwardly extended upper flanges, fastening means securing said upper flanges together in spaced relation to effect clamping of said lower flanges about said opening, a gasket interposed between the lower flange of the upper shoe member and the upper surface of said wall, the upper flange of said upper shoe member being adapted to receive the flange of a connecting outlet member, and a gasket interposed between the outlet member flange and said upper flange of said upper shoe member, said fastening means extending through said outlet member flange, gasket, and the upper flanges of said shoe members whereby to provide an airtight joint between the air conducting cell and said outlet member.

References Cited in the file of this patent

UNITED STATES PATENTS

| Number | Name | Date |
| --- | --- | --- |
| 90,862 | Merrill | Jan. 1, 1869 |
| 575,583 | Athinson et al. | Jan. 19, 1897 |
| 602,332 | Jones | Apr. 12, 1898 |
| 915,792 | Palmer et al. | Mar. 29, 1909 |
| 1,608,115 | Neidecken | Nov. 23, 1926 |
| 1,766,621 | Fleming | June 24, 1930 |
| 1,792,345 | Williams | Feb. 10, 1931 |
| 1,867,433 | Young | July 12, 1932 |
| 1,941,714 | Pasman | Jan. 2, 1934 |
| 1,959,132 | Jones | May 15, 1934 |
| 1,979,543 | Heasley | Nov. 6, 1934 |
| 1,999,277 | Boosey | Apr. 30, 1935 |
| 2,244,402 | Powers | June 3, 1941 |
| 2,473,053 | De Roo | June 14, 1949 |
| 2,528,919 | Stone | Nov. 7, 1950 |
| 2,555,583 | Ewing | June 5, 1951 |
| 2,705,912 | Dovolis | Apr. 12, 1955 |
| 2,729,429 | Goemann | Jan. 3, 1956 |
| 2,739,317 | Abresch | Mar. 27, 1956 |